US006984194B2

(12) United States Patent
Ma

(10) Patent No.: US 6,984,194 B2

(45) Date of Patent: Jan. 10, 2006

(54) FOLDABLE BIKE

(75) Inventor: Pei-Chuan Ma, Taipei (TW)

(73) Assignee: New Art City Industrial Co., Ltd., Taipei (TW)

(*) Notice: Subject to any disclaimer, the term of this patent is extended or adjusted under 35 U.S.C. 154(b) by 457 days.

(21) Appl. No.: 10/383,758

(22) Filed: Mar. 10, 2003

(65) Prior Publication Data

US 2004/0180758 A1 Sep. 16, 2004

(51) Int. Cl.
*A63B 22/06* (2006.01)

(52) U.S. Cl. ......................... 482/57; 280/278; 280/287

(58) Field of Classification Search .................. 482/51, 482/57, 148; 280/275, 278, 283, 287
See application file for complete search history.

(56) References Cited

U.S. PATENT DOCUMENTS

| | | | | |
|---|---|---|---|---|
| 4,579,360 A * | 4/1986 | Nishimura et al. | ......... | 280/278 |
| 4,955,628 A * | 9/1990 | Chiu | .......................... | 280/239 |
| 5,330,219 A * | 7/1994 | Groendal et al. | ........... | 280/275 |
| 5,836,602 A * | 11/1998 | Wang | ......................... | 280/287 |
| 6,354,618 B1 * | 3/2002 | Liao | ........................... | 280/287 |
| 6,513,823 B1 * | 2/2003 | Chen | .......................... | 280/284 |
| 6,581,492 B1 * | 6/2003 | Chen | ......................... | 74/551.3 |
| 2003/0067137 A1 * | 4/2003 | Chen | .......................... | 280/278 |

* cited by examiner

*Primary Examiner*—Stephen R. Crow
*Assistant Examiner*—Tam Nguyen
(74) *Attorney, Agent, or Firm*—Leong C. Lei

(57) ABSTRACT

An improved structure of a foldable bike includes a turntable containing an upper bearing and a lower bearing provided between a crossbar and a head tube; a pair of recesses being provided in symmetry in the turntable to be fixed by a locking mechanism provided below the crossbar; a folding structure and an absorber being provided to a seat pole of the bike with the absorber being locked to a chain stay; the bike being ready for riding when the locking mechanism and the absorber being fixed in position; and when the locking mechanism and absorber being released, the bike being folded up with the seat pole as a support to facilitate handling or storage.

6 Claims, 6 Drawing Sheets

FOLDABLE BIKE

BACKGROUND OF THE INVENTION (a) Field of the Invention

The present invention is related to an improved structure of a foldable bike, and more particularly, to one that allows easy and fast folding to facilitate handling or storage of the bike.

(b) Description of the Prior Art

Whereas more and more people are acting out their commitments to healthy leisure sports and energy saving, bike carrying both purposes has been very welcome by consumers. However, most of the bikes generally available in the market are design for riding comforts and operation without much consideration given to the handling and storage of the bikes when not used. Consumers always are troubled by the problems of handling or storing their bikes. Improvements of various types of foldable bikes are therefore made available in the attempt to solve the handling and storage problems. However, the folding mechanism usually gets too complicate and prevents easy operation.

Therefore, it is an object of the present invention to provide an improved structure of a foldable bike that allows easy and fast folding to facilitate handling or storage of the bike.

SUMMARY OF THE INVENTION

This invention is related to an improvement in the structure of a foldable bike.

The primary purpose of the present invention is to provide an improved structure of a foldable bike that allows easy and fast operation to facilitate handling or storage of the bike when not used. To achieve the purpose, a bearing is provided where between a seat tube and a head tube of the bike. A pair of recesses in symmetry is provided on the bearing. A locking hook retractable in a sleeve is provided below a crossbar connected to a seat pole for the seat pole to be fixed in position for riding with the locking hook engaged in those two recesses in the bearing. Once the locking hook is released from those two recesses in the bearing, the seat pole is turned along a chain stay to fold up the bike.

A sleeve is inserted into the seat pole and connected to a seat tube that connects a chain stay. A bolting mechanism is provided on the sleeve to lock into multiple holes provided on the seat tube for the seat tube and the chain stay to stay in position when the bike is in use for riding.

A bracket is provided to the sleeve inserted in the seat pole and an L-shape groove is provided on the bracket for an absorber connected to the chain stay to be fixed at the bracket by means of a fast releaser for absorption purpose. When the bike is not use, the absorber is cleared from the bracket also by means of the fast releaser to facilitate, folding up the bike.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
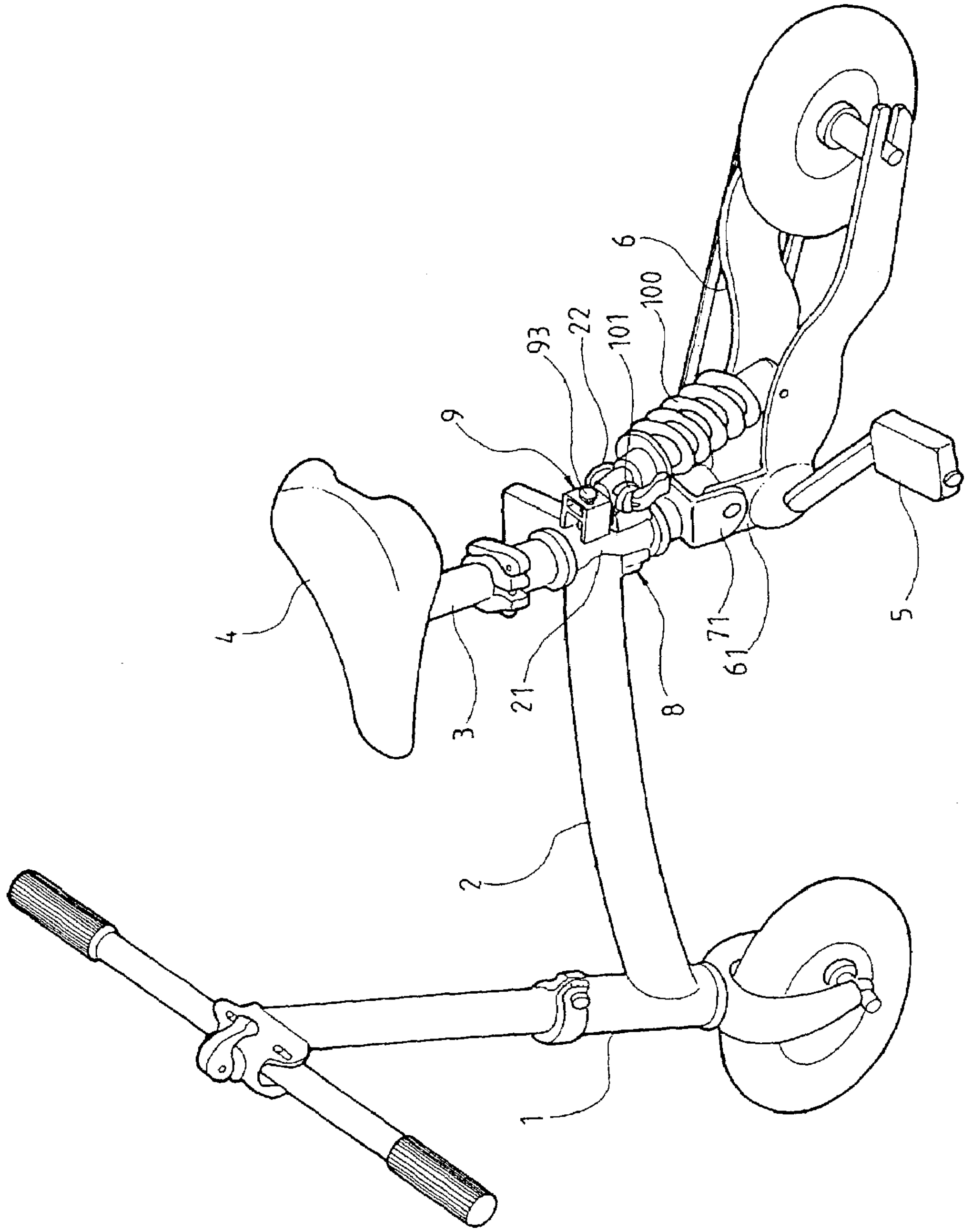
FIG. 1 is a perspective view of a preferred embodiment of the present invention.
Figure 2:
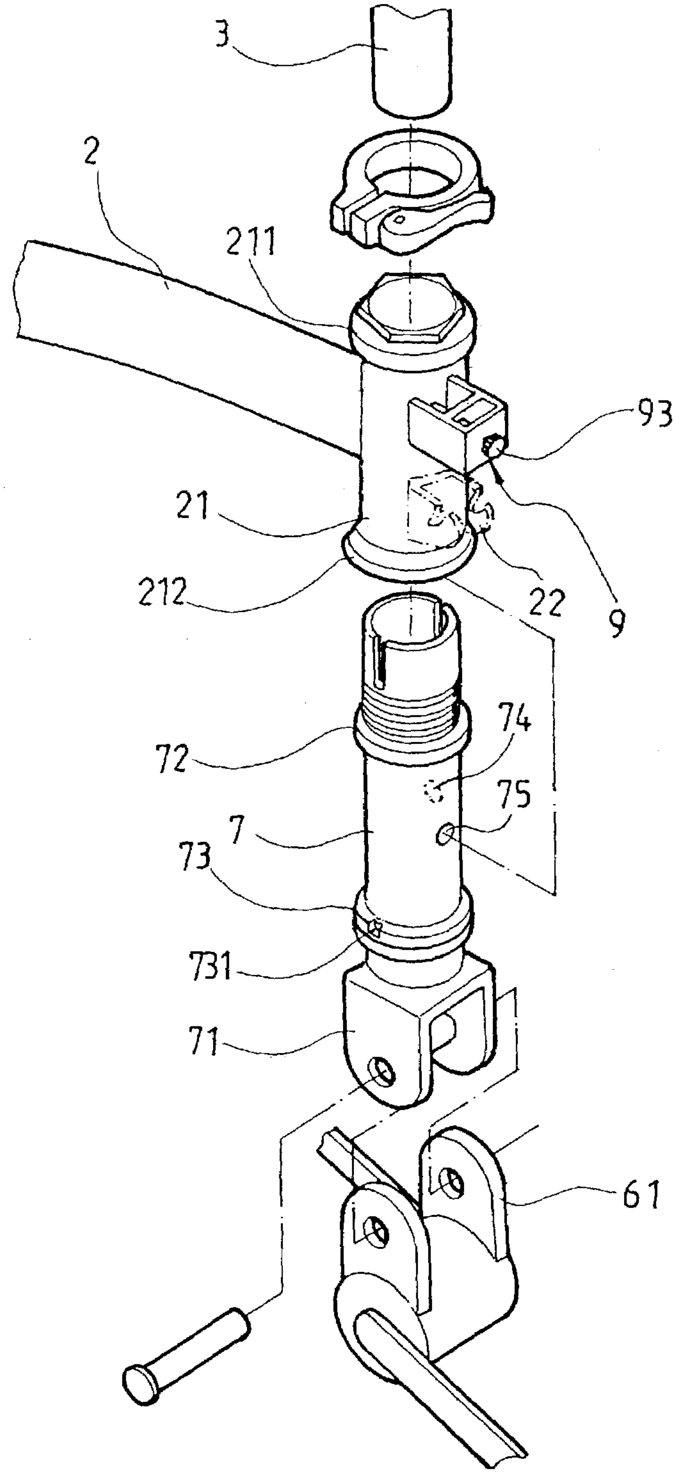
FIG. 2 is a view showing the combination of a seat tube and a crossbar of the preferred embodiment of the present invention.

Referring to FIGS. 1 and 2, a preferred embodiment of the present invention is essentially comprised of a head tube 1, a crossbar 2, a seat pole 3, a seat 4, a pair of pedals 5 and a chain stay 6 of the prior art. Wherein, the crossbar 2 is connected to a sleeve 21 provided with an upper flange and a lower flange on both ends to receive insertion by a seat tube 7. A pair of brackets 71 in symmetry is provided at the bottom of the seat tube 7 to be respectively pivoted to another pair of brackets 61 provided on the chain stay 6 while those two brackets 61 on the chain stay 6 are connected to the pair of pedals 5.

A turntable comprised of an upper bearing 72 and a lower bearing 73 is provided to the seat tube 7. A recess 731 is provided on the lower bearing 73 and two through holes 74,75 are provided in the seat tube 7. A gap 213 provided on a lower flange 212 of the sleeve 21 to be locked up by a locking mechanism 8 provided on the sleeve 21 when the lower flange 212 covers up the upper bearing 72. On the side relative to the locking mechanism 8, a bolting mechanism comprised of a holder 91, a coil 92 and a bolt 93 is provided.

A pair of brackets 22 in symmetry is provided on the sleeve 21 in the rear of the bolting mechanism 9. Each bracket 22 is provided with an L-shape groove 221 for an absorber 100 to be connected to where behind the head tube 1. A fast releaser 101 is provided on the top of the absorber 10 to be engaged into or released from the groove 221 in the bracket 22.

When the locking mechanism 8 locks up the recess 731 in the lower bearing 73 and held in position by the bolting mechanism 9, and the absorber 10 is fixed to both brackets 22 of the sleeve 21 by means of the fast releaser 101, the bike is ready for riding. When the bike is not used, the head tube 1 is folded backwardly by turning along the lower bearing 73 when both of the locking mechanism 8 and the fast releaser 101 are released to facilitate handling or storage.

Figure 3:
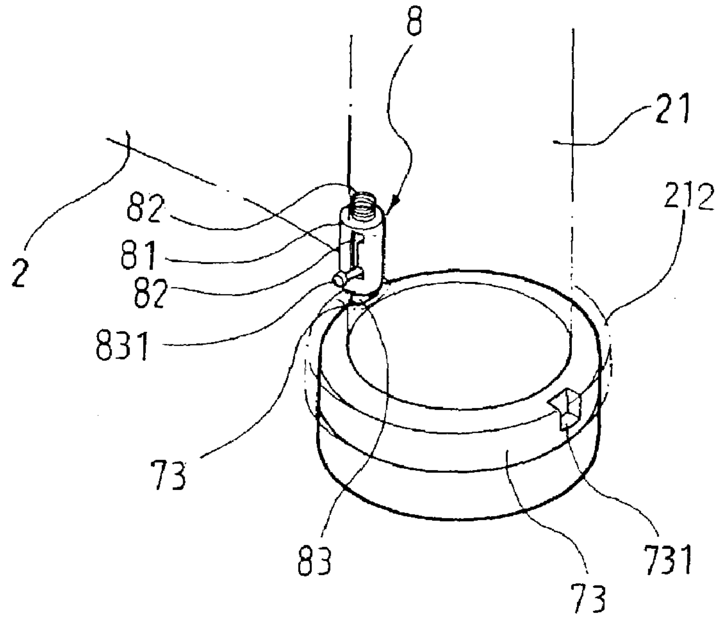
FIG. 3 is a perspective view of a locking mechanism of the preferred embodiment of the present invention.
Figure 4:
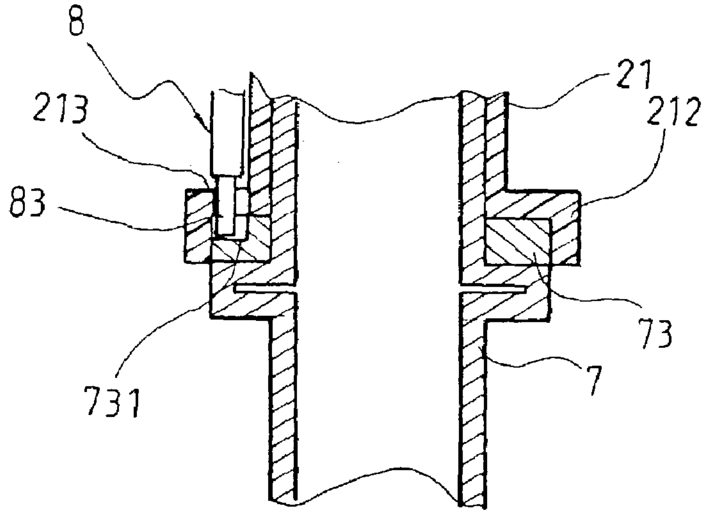
FIG. 4 is a sectional view of the locking mechanism of the preferred embodiment of the present invention.
Figure 5:
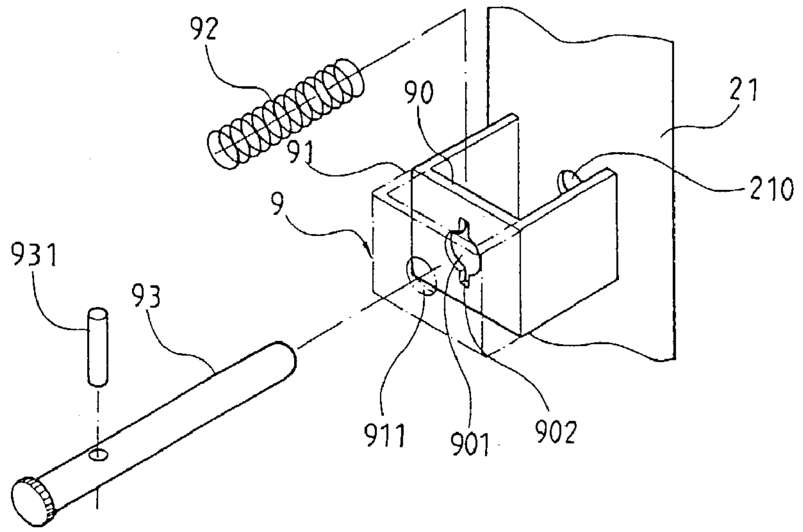
FIG. 5 is a perspective view of a bolting mechanism of the preferred embodiment of the present invention.

Now referring to FIGS. 3 and 4, the locking mechanism 8 is provided with a sleeve 81 at right angle to the crossbar 2. A ⊂-shaped hole 82 is provided inside the sleeve to allow the insertion of a locking lever 83 and a coil 84 into the sleeve 81 with a pull handle 831 from the locking lever 83 penetrating out of the hole 82 for the pull handle 831 to manipulate push up or push down of the pull lever 83, and further for the pull lever 83 to penetrate through the gap 213 in the sleeve 21 to be locked in or released from the recess 731 in the lower bearing 73.

Figure 6:
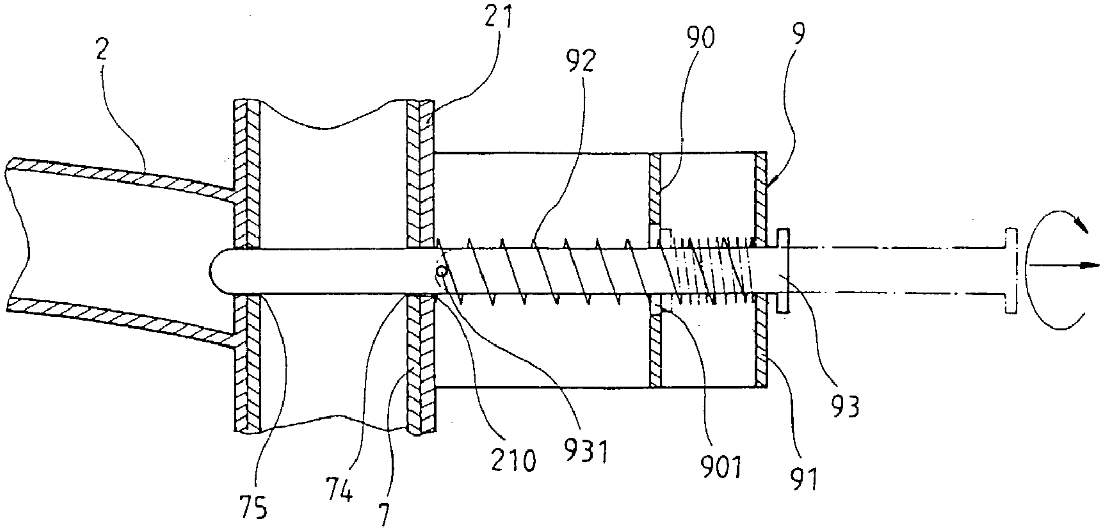
FIG. 6 is a sectional view showing the operation of the bolting mechanism of the preferred embodiment of the present invention.
Figure 7:
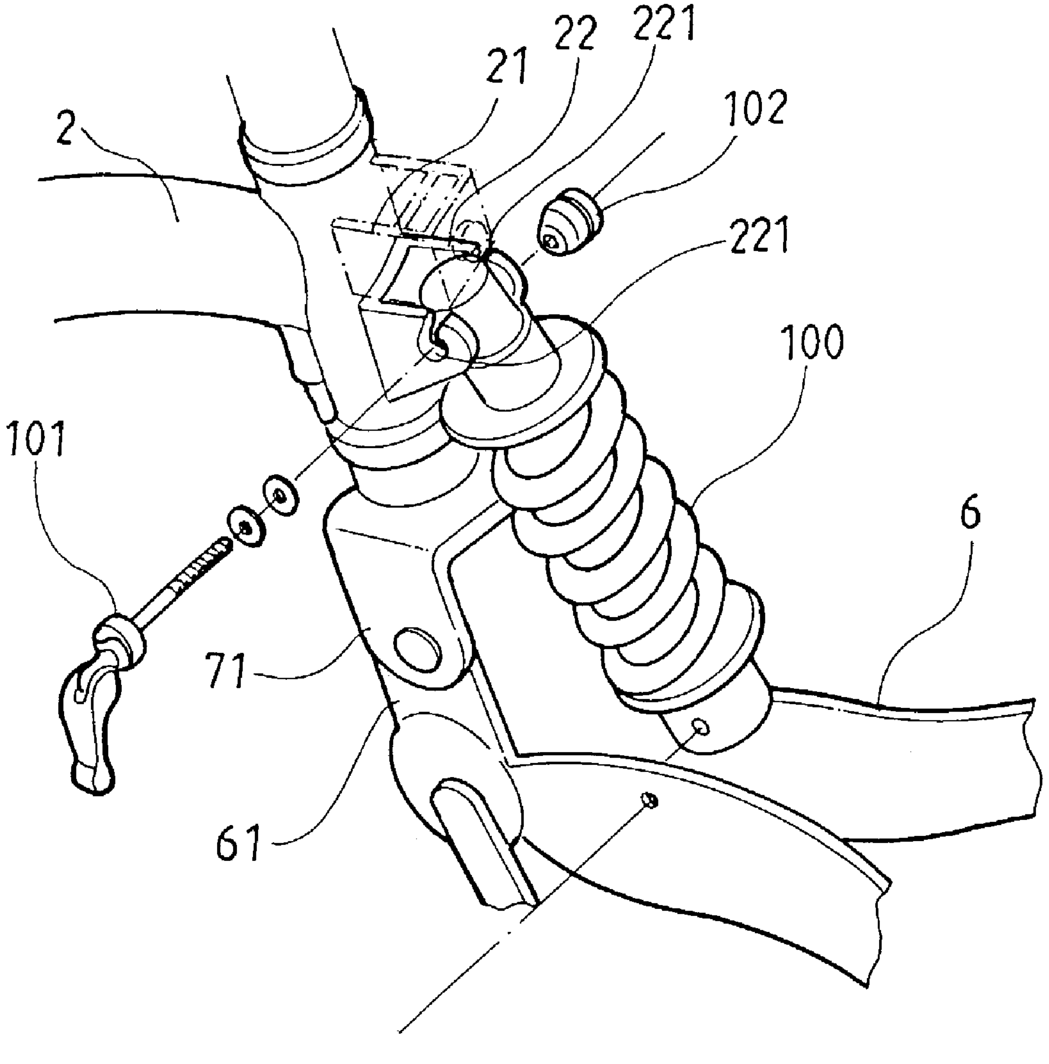
FIG. 7 is a perspective view of an absorber used in the preferred embodiment of the present invention.

As illustrated in FIGS. 6 and 7, the bolting mechanism 9 is provided with the (-shape holder 91, a plate 90 provided with a circular hole 901 is disposed inside the holder 91. An opening 902 is each provided on the upper edge and the lower edge of the circular hole 901 while a matching through hole 911 is provided on the holder 91. The bolt 93 passing through the through hole 911 and the circular hole 901 is then inserted with the coil 92 and a fixation bolt 931 so that when the bolt 93 is pulled outwardly, the seat tube 7 inside the sleeve 21 is tuned to allow the bolt 93 to pass through a through hole provided in the sleeve 21 and inserted into those two through holes 74, 75 in the seat tube 7 for holding the bike in position.

Now referring to FIG. 7, the absorber 10 is provided at its top the fast releaser 101 to be locked up by means of a locking member 102 for the absorber 10 to be pressed and fixed by means of those grooves 221 in both brackets 22 locked to the sleeve 21, and serving its purpose of absorption while a rider is riding on the bike. When the bike is not use and to be folded up, the absorber 100 is released by pulling up the fast releaser 101 to clear away from those two brackets 22.

Figure 8:
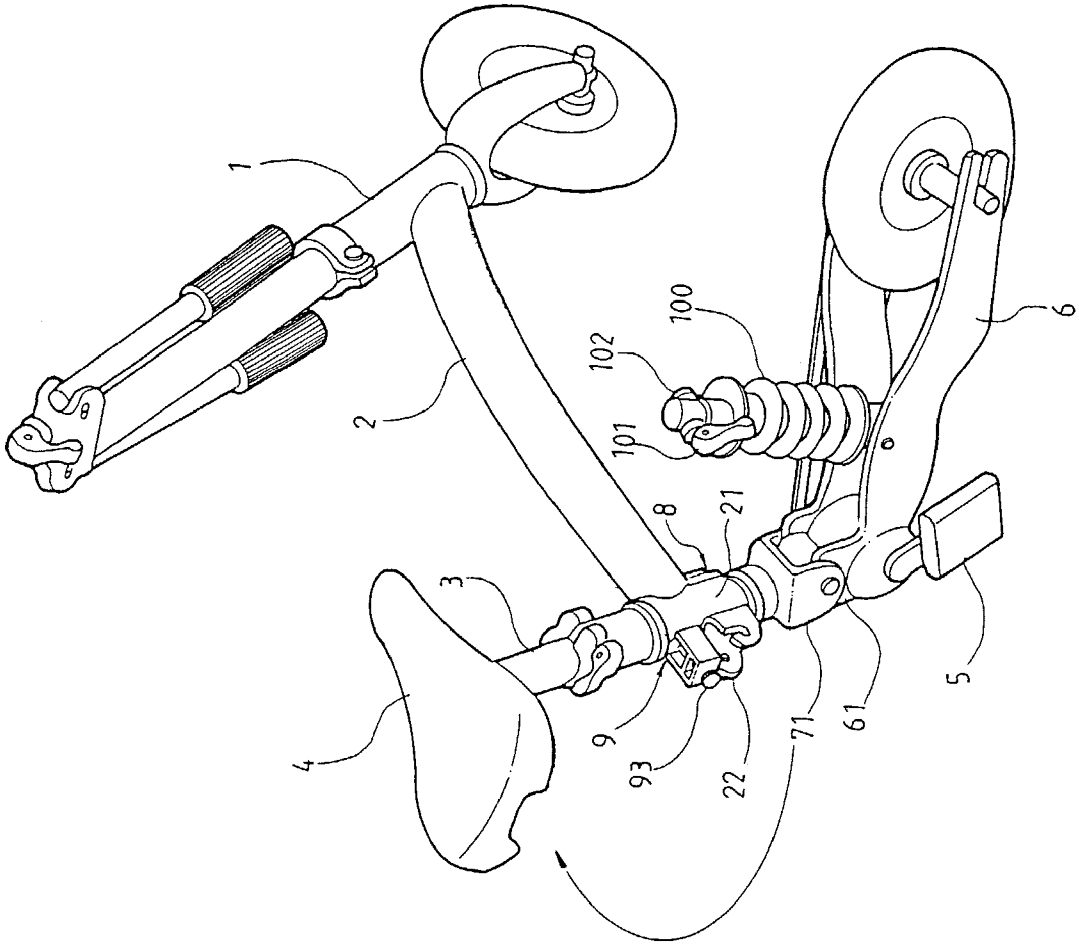
FIG. 8 is a schematic view showing the folding up of the preferred embodiment of the present invention.

When folded up as illustrated in FIG. 8, the locking mechanism 8 and the absorber 10 are released from the lower bearing 73 and the brackets 22. The bolt 93 of the bolting mechanism 9 is pulled up to allow the sleeve 21 to turn around the lower bearing 73 and to fold both of the head tube 1 and the crossbar 2 backwards. Since the bike has the seat tube 7 as support, the rear section of the bike is shorter than the front section and when folded up, the rear wheel is merely placed at where below the crossbar 2 to reduce the size of the bike for easier handling and storage.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A foldable bike comprising a head tube, a seat pole, a crossbar provided with a sleeve and connected to the head tube, a seat tube being inserted with the seat pole and penetrating through the sleeve, two through holes being provided on the seat tube, a chain stay and a pair of pedals wherein the seat tube is connected to the chain stay by means of a pair of brackets in symmetry on the seat tube and the chain stay; a turntable comprised of an upper bearing and a lower bearing is provided above the both brackets on the seat tube; a pair of recesses in symmetry are provided at the lower bearing of the turntable; a locking mechanism and a bolting mechanism are provided on the surface of the sleeve below the crossbar to lock or unlock the cross bar from the turntable and the seat tube; an absorber is provided to the sleeve at the crossbar; a fast releaser is provided at the top of the absorber, a pair of L-shape grooves are provided in symmetry on an upper edge of sleeve brackets located on a rear side of the sleeve such that the bike is ready for riding when the absorber is locked into the sleeve brackets and the cross bar is locked into a forward operating position relative to the seat tube, and the bike is ready for storage when the head tube is folded backwards around the turntable and the absorber is released from the two grooves by means of the fast releaser.

2. The a foldable bike as claimed in claim 1, wherein, the sleeve provides a locking mechanism below the cross bar; the locking mechanism comprises a small cylindrical sleeve having a c shaped hole to accommodate a locking lever and a coil; a pull handle is provided to the locking lever and exposed from the ⊂-shaped hole to pull the locking lever to either lock into or release from the recesses in the turntable.

3. The a foldable bike as claimed in claim 1, wherein, the bolting mechanisms a c-shaped holder on the surface of the sleeve holder; a plate provided with a circular hole being disposed inside the holder; a gap is being provided to the upper edge and the lower edge of the circular hole; a through hole to match the circular hole provided on the holder; a bolt, having concentric coil, penetrates through the through hole and the circular hole to receive a fixation bolt; and the bolt being inserted into various through holes on the seat tube for positioning purposes depending on whether the bike being used for riding or folded up for storage.

4. The foldable bike as claimed in claim 1, wherein, a pair of brackets in symmetry is respectively provided to the seat tube and the chain stay is pivoted relative to each other for achieving the purpose of absorption when the chain stay swings.

5. The foldable bike as claimed in claim 2, wherein, an upper flange and a lower flange is provided to the sleeve on the crossbar; a gap is provided at the lower flange; the seat tube penetrating through the lower flange to be contained by the turntable of seat tube; and the lever of the locking mechanism penetrating through the gap to be locked in the recesses of the turntable.

6. A foldable bike as claimed in claim 1, wherein when the bike is folded for storage, a rear wheel of the bike may be rotated to rest underneath the crossbar.

* * * * *